Figure 4:
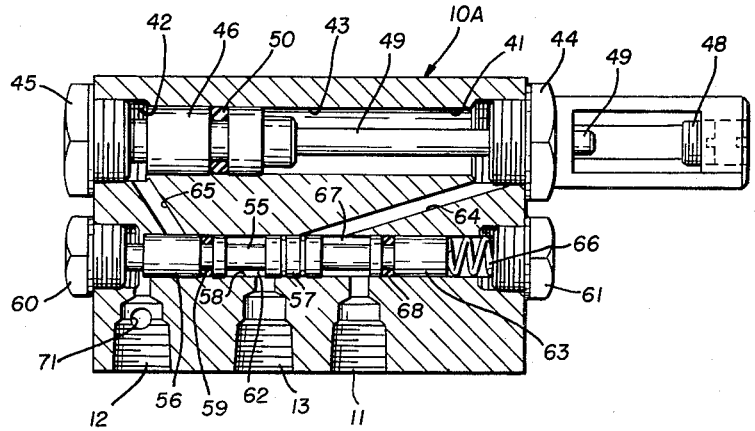

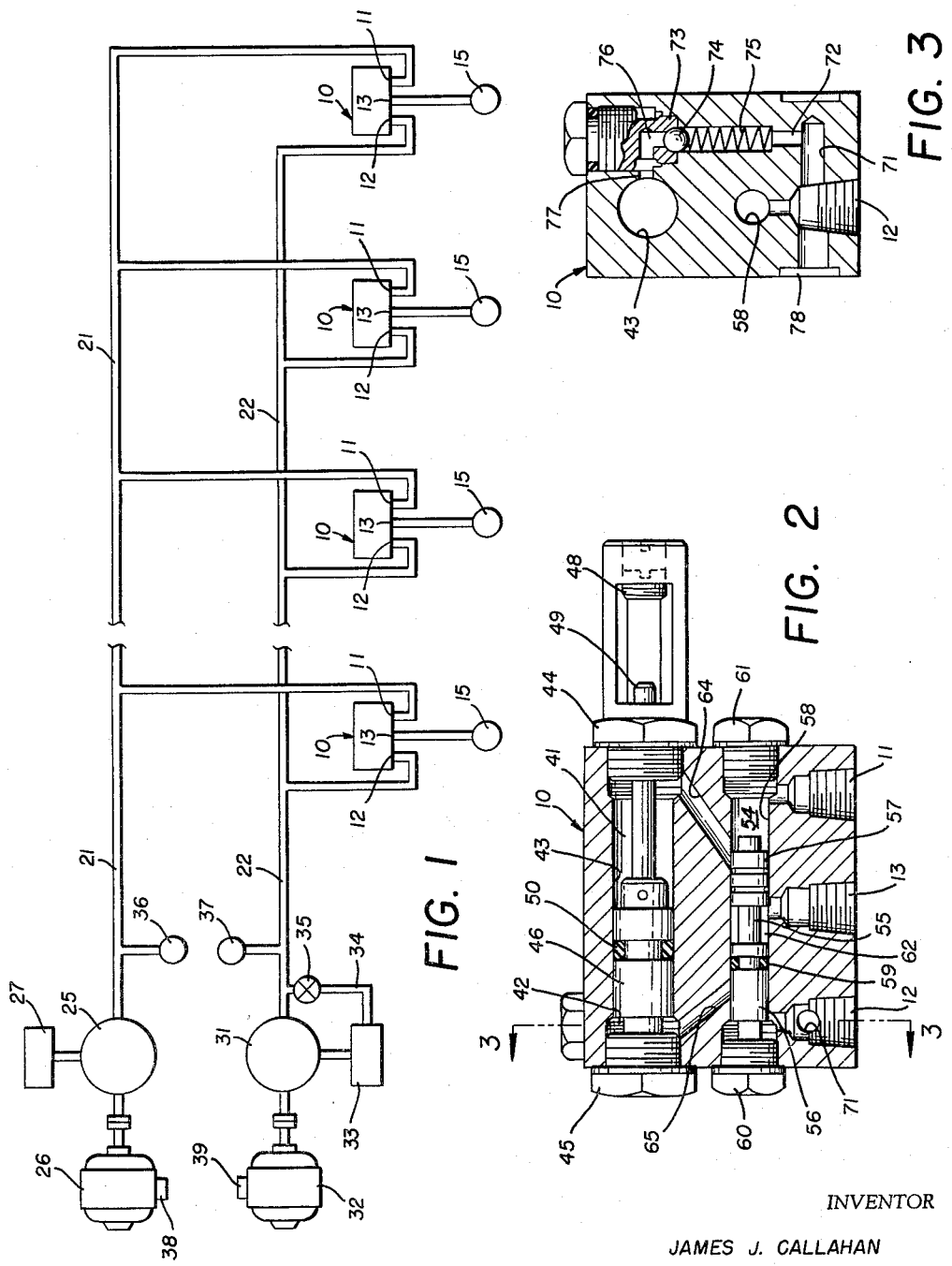

INVENTOR
JAMES J. CALLAHAN
ATTORNEYS

United States Patent Office 2,996,147
Patented Aug. 15, 1961

2,996,147
DOUBLE HEADER LUBRICATING SYSTEM
James J. Callahan, Mentor, Ohio, assignor to Trabon Engineering Corporation, Solon, Ohio, a corporation of Ohio
Filed Oct. 13, 1959, Ser. No. 846,200
4 Claims. (Cl. 184—7)

This invention relates to a centralized lubricating system of the type wherein parallel headers are provided, one of which supplies lubricant to one or a plurality of lubricant injection units which receive the lubricant under a relatively low pressure and from which the lubricant is discharged into the bearings or other sites to be lubricated under increased pressure applied by means of the same or usually of another fluid supplied through the other header. The invention is particularly advantageous where the bearings or other items to be lubricated require a high injection pressure and where the lubricant is relatively compressible, as are most greases, so that pressure at the output end of a long conduit tends to be considerably lower than pressure at the input end whereby extremely high input pressures are required to accomplish a high injection pressure at a remote site unless a pressure boosting injecting unit is provided at the remote site.

Lubricating systems of the same general type as that to which the invention relates have been heretofore provided. An example is found in the U.S. patent to Hawks, No. 2,038,287.

An object of the present invention is to provide a system of the above general type which is positive and reliable in operation in a maner not heretofore achieved.

One feature of the invention is the provision of a lubricating system of the above general type in which grease or the like may be constantly supplied to injection units without the proper operation of the units depending in any degree upon relief of grease pressure at the unit or elsewhere, thereby rendering the operation of such units independent of pressure gradients established in the grease supply header. In this connection, it may be borne in mind that an injection unit relatively close to the supply source will tend to have supplied to it grease under a considerably higher pressure than a unit located remotely from the supply source along the same grease supply header.

Another object of the invention is to provide a system of the above general type in which feeding of injection-pressure-imposing fluid is a necessary condition for the initiation and completion of lubricant injection in the intended immediately following portion of the cycle of operation of the device.

More generally, an object of the invention is to assure the distribution of lubricating fluid from the several injection units in the intended proportions in a positive manner and to eliminate the aberrations in proportioning from the plurality of units which have previously tended to occur in lubrication systems of this type, particularly in applications where high pressure gradients along the grease supply line have existed.

These and other objects and advantages of the invention will become more fully apparent from the following description of systems and injection units embodying the invention. This apparatus is described merely by way of illustrative example.

Figure 5:
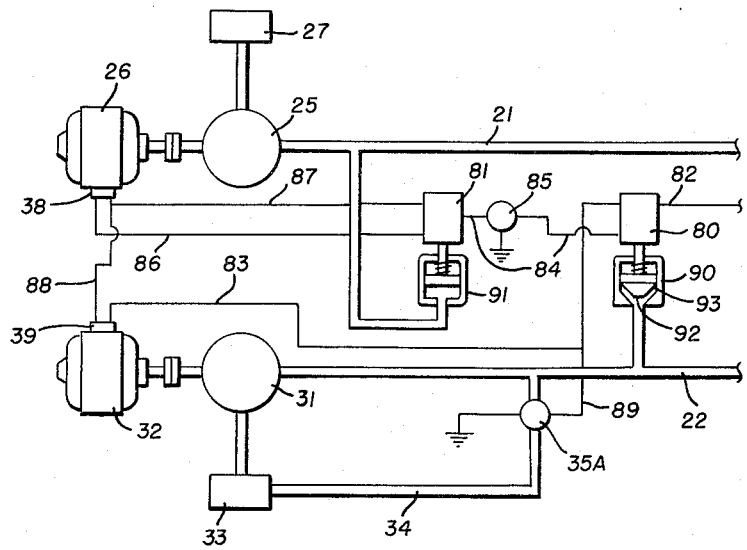

In the drawings:
FIGURE 1 is a diagrammatic view of a centralized lubricating system illustrating the invention.
FIGURE 2 is a greatly enlarged cross-sectional elevation of one of the plurality of injection units indicated in FIGURE 1.
FIGURE 3 is a cross-section taken on the plane of line 3—3 in FIGURE 2.
FIGURE 4 is a view similar to FIGURE 2, illustrating a modified injection unit.
FIGURE 5 is a view similar to the left hand portion of FIGURE 1 illustrating a modified fluid supply means for a lubricating system otherwise similar to that of FIGURE 1.

Shown in FIGURE 1 are a plurality of fluid injector units 10. Each of the fluid injector units 10 has a first port 11 for accepting fluid to be injected to an associated lubricating site. Each of the injector units has a second port 12 for accepting fluid which imposes injection pressure in the injector unit. A third port 13 on each unit empties to an associated lubricating site, such as a bearing or the like, indicated by the reference numeral 15. A first header 21 is connected to the first ports 11 of the several injector units 10, and a second header 22 is connected to the ports 12 of the several injector units 10. Appropriate means are provided for supplying fluid to the headers. The fluid supplied to the header 21 may appropriately be a grease capable of a considerable degree of compression and of a type and grade employed for lubricating purposes. The fluid supplied to the header 22 may be of much lower viscosity and may be relatively incompressible, such as any one of the numerous hydraulic oils employed in hydraulic control systems.

Grease is supplied to the first header 21 by a grease pump 25 powered by a grease pump motor 26 and supplied with grease from a reservoir 27. It may be noted that a return line from the header 21 to the reservoir 27 may not necessarily be provided in all applications and is not provided in the illustrated system. Hydraulic fluid is supplied to the header 22 by the fluid pump 31 powered by a fluid pump motor 32 and supplied with hydraulic fluid from a reservoir 33. A bypass return line 34 is provided from the output side of the pump 31 to the reservoir 33 so that pressure in the header 22 may be relieved by opening valve 35 in the line 34. Suitable pressure gauges 36 and 37 are provided in the lines 21 and 22, respectively. The pump motor 26 is controlled by motor control relays including starting and stopping relays which may be located at 38 and which may be manually operated by suitable switches (not shown) to actuate and deactuate the motor 26. The pump motor 32 is similarly controlled by starting and stopping relays located at 39.

In the operation of the system, which in this case is not automatic, the operator observes the pressure at the gauge 36 and if this pressure is below a designed predetermined value, say 600 p.s.i., the operator actuates the motor 26 only until the pressure indication at the gauge 36 is above 600 p.s.i. at which time actuation of the motor 26 is discontinued. The operator then actuates the motor 32 only until such time as the indicated pressure at the gauge 37 reaches a desired value, say 2000 p.s.i. When the intended pressure is indicated, the operator deactivates the motor 32 and opens the valve 35 to relieve the header 22 of pressure. He thereupon recloses the valve 35 and the system is ready for a succeeding cycle of operation which may be carried out after any desired time interval.

Of course, it should be apparent that the control operations described above may be carried out by appropriate automatic means, an example of which will be described below. However, the above description shows a fluid supply system for the grease header 21 and the hydraulic fluid header 22 which, in the described mode of manual operation, embodies the principles contemplated by the invention and will be understood to constitute means for supplying grease to the first header 21 and for alternately supplying hydraulic fluid at a relatively higher pressure to the second header 22 and then relieving the pressure in the second header.

Each of the injector units 10 has first and second coaxial hydraulic piston chambers 41 and 42 comprising opposite ends of the common bore 43. The opposite ends of the common bore 43 are closed by the end plugs 44 and 45. Hydraulic piston means comprising in the illustrated example a piston head 46 is provided in fluid-sealing sliding relationship with each of the chambers 41 and 42 to associate the chambers in hydraulic opposition to each other for back and forth movement of the piston head between a first limiting end condition toward the right end of the bore 43 and a second limiting end position toward the left end of the bore 43. It will be seen that at the first limiting end position, the volume of the first chamber 41 is minimized, and at the second limiting end position, the volume of the chamber 42 is minimized. The amount of such minimum value of the first chamber 41 may be adjusted by means of a set screw 48 which coacts with a rod 49 forming part of the assembly moving with the hydraulic piston 46. The piston 46 may be annularly slotted and carry an appropriate sealing ring 50.

Provided in each injector unit 10 is a valve which includes valving means in the form of a reciprocating shaft 55 having sealing pistons 56 and 57 which are slidingly received within a bore 58 in fluid-sealing relationship therewith. The piston 56 may be annularly slotted and provided with a sealing ring 59 as indicated. Suitable end plugs 60 and 61 seal the opposite ends of the bore 58. The first port 11 of each unit communicates with the bore 58 toward the right end thereof, as seen in FIGURE 2, and the second port 12 communicates with the bore 58 toward the left end thereof. In the leftmost position of the shaft 55, as seen in FIGURE 2, the chamber 62 (defined by the spacing of the shaft 55 from the walls of the bore 58 between the pistons 56 and 57) communicates solely with the port 13. The right end of the bore 58 communicates with a passage 64 leading to the piston chamber 41. The passage 65 leading from the piston chamber 42 to the bore 58 is cut off by the piston 56. In the opposite or rightmost end position of the valving means, the passage 64 is connected to the port 13 by the chamber 62 and the passage 65 is connected to the port 12.

It will be seen that at all times the outboard face of the piston 57 is subjected to such pressure as may obtain at the port 11 and the outboard face of the piston 56 is subjected to such fluid pressure as may obtain at the port 12. Any pressure existing at the port 11 tends to bias the valving means to the above-mentioned leftmost position, and any pressure existing at the port 12 tends to bias the valving means to the above-mentioned rightmost position.

There is provided bypass means including a check valve allowing flow from the second chamber 42 to the second port 12 at all times but preventing flow through the bypass in the opposite direction. The bypass includes passages 71 and 72 and a check valve including a valve plug 73 and a ball check 74 adapted to be received in a seat formed at the end of the plug 73 and urged in seating relationship by the spring 75. The plug 73 contains a passage 76 which communicates through a short hole 77 with the bore 43. The opening formed in the process of drilling the passage 71 is plugged as by a welded disc or plug or the like indicated by the reference numeral 78.

A modified injector means 10A is illustrated in FIGURE 4. This modified type of unit may be substituted for the unit 10 indicated in FIGURE 1. Such modified unit 10A is generally similar to the unit 10 and like elements are indicated by the same reference numerals. The injector unit 10A is somewhat elongated and is provided with an additional piston 63 associated with the valving member moving in the bore 58. The piston 63 may be annularly slotted and provided with a sealing ring 68. The piston 63 together with the piston 57 and the bore 58 define a chamber 67 which is adapted to connect the port 11 to the passage 64 in the first or leftward position of the shaft 55, as illustrated. The valving means are urged toward such position by a spring 66 received in the right hand end of the bore 58 and retained therein by the plug 61. Accordingly, it will be understood that at all times the shaft 55 is subjected to the biasing of the spring 66 to urge it toward the first or leftmost valve position as shown in FIGURE 4. However the spring 66 is capable of being overridden by a sufficient elevation of pressure at the port 12 to urge the valving means toward the right to the second valve position at which the passage 64 is connected to the passage 13 and the passage 12 is connected to the passage 65.

Thus, in both the structures shown in FIGURES 2 and 4, the valving means is subjected at all times to means biasing it toward the first valve position, such means being the unbalanced pressure chamber 54 at the right hand end of the bore 58 in the case of the FIGURE 2 apparatus, and such means being the spring 66 in the FIGURE 4 apparatus.

As previously mentioned, means may be provided to automatically supply fluid to the first header 21 and alternately supply fluid under relatively higher pressure to the header 22 and relieve the header 22 from such higher pressures. As shown by way of example in FIGURE 5, there may be provided a pressure-responsive switch actuator 90 connected to the header 22 to sense pressure therein and adapted to actuate the switch 80. Also provided is a second pressure-responsive switch actuator 91 connected to the header 21 to sense pressure therein and adapted to actuate the switch 81. The switch 80 connects an input electrical lead 82 to a lead 84 when the switch is in a first position and connects such input lead 82 to a lead 83 when the switch is in its alternate or second position. The actuator 90 may be adapted in a well known manner to assume a first of two positions at all times when the pressure in the second header 22 is below a desired value, say 150 p.s.i., and to remain in such first position even during a pressure rise above 150 p.s.i. (due to the reduced effective face area 92) and until a certain upper limit of pressure, say 2000 p.s.i., is reached at which time the actuator 90 is adapted to move the switch 80 to its second position connecting the line 82 to a line 83 leading to a stopping relay for the motor 32 and also through a lead line 89 energizing a solenoid-controlled valve 35A to open the valve and relieve pressure in the header 22, thereby causing line pressure to drop. Due to the now increased effective face area (which now includes the conical area 93 as well as the reduced central area 92) the actuator 90 remains raised until the pressure drops below 150 p.s.i. at which time the switch 80 returns to its first position. In the first position, the switch 80 reconnects the input electrical lead 82 to the lead 84 which has inserted therein a time delay switch 85 adapted to operate in a well known manner to delay the completion of the circuit through the lead 84 to the switch 81 for a desired time interval following each energization of the lead 84 as by movement of the switch 80 to its first position. In a first position of the switch 81, the output or terminal end of the lead 84 is connected to a lead 86, and at a second position of the switch 81, the output or terminal end of lead 84 is connected to leads 87 and 88. The switch 81 is moved by the actuator 91 to its first or second position according to whether the pressure in the header 21 is respectively below or above a desired value, say 600 p.s.i. Energization of lead 86 energizes the motor starter relay of the motor 26. Energization of the lead 87 energizes the motor stopping relay of the motor 26. Energization of the lead 88 energizes the motor starting relay of the motor 32.

When the system is turned on to supply current through the line 82, the switch 80 will initially be in its first position and the lead 82 will be connected to the lead 84 causing the time delay switch 85 to be energized, and after the pre-set time interval the circuit will be completed through the lead 84 to the switch 81. The switch 81 will be in its first position if the pressure in the header 21 is below 600 p.s.i. in which case the motor 26 will be actuated to raise pressure in the header 21 by actuation of the pump 25 and thereby assure delivery of grease to all the piston chambers 41 of the respective injector units 10. It is to be noted that the piston chamber 41 most remote from the unit 10 may have greater supplied thereto at only a few pounds per square inch, while the equivalent chamber of the closest injector unit 10 may have grease supplied thereto at almost 600 p.s.i.

When the pressure in the header 21 reaches 600 p.s.i, the switch 81 will move to its second position thereby causing the motor 26 to stop and the motor 32 to start. The motor 32 will operate to actuate the pump 31 and thereupon operate to raise the pressure in the header 22 up to 2000 p.s.i., in the course of which rise in pressure the valve means of all the injector units 10 will be moved to their second valving positions and grease will be injected from the several chambers 41 to the several bearings or other lubricating sites 15. Such injection of grease from each unit can occur only after its valve means has moved to its second valving position. When the pressure of 2000 p.s.i. is reached, the switch 80 will be moved to its second position to interrupt current flow in the lead 84 and also to energize the lead 83 and thereby stop the motor 32 and also energize the lead 89 and thereby open the valve 35A. Pressure in the header 22 will thereupon be relieved to cause the switch 80 to again move to its first position whereby the system is prepared for a succeeding cycle, the completion of which will be delayed according to the time interval for which the time delay switch 85 is set. If sufficient pressure remains in the header 21, total or partial recharging of the grease chambers 41 of the several units will occur when pressure is relieved from the header 22 upon opening of the valve 35A. At the latest, such charging will be completed during a succeeding cycle as described above.

The invention is not restricted to the slavish imitation of each and every one of the details described above which have been set forth merely by way of example with the intent of most clearly setting forth the teaching of the invention. Obviously devices may be provided which change, eliminate or add certain specific structural details without departing from the invention.

What is claimed is:

1. In a lubricating system, a plurality of lubricating fluid injector units each having a first port for accepting fluid to be injected to an associated lubricating site, a second port for accepting fluid for imposing injection pressure and a third port emptying to said associated lubricating site, a first header connected to said first ports, a second header connected to said second ports, means for supplying fluid to said first header and for alternately supplying fluid under relatively higher pressure to said second header and relieving said second header, each injector unit including first and second coaxial hydraulic piston chambers, hydraulic piston means in fluid-sealing sliding relationship with each of said first and second chambers and associating said chambers in hydraulic opposition to each other for back and forth movement of said hydraulic piston means between first and second limiting end positions at which are minimized the volumes of said first and second chambers, respectively, a valve in each unit and including valving means moveable between a first valving position at which said first chamber is connected to receive inflow from said first port and said second chamber is connected to said second port solely through one-way flow imposing means allowing flow from said second chamber to said second port but not in the opposite direction and a second valving position at which said first chamber is connected to empty to said third port and said second chamber and second port are interconnected to bypass said one-way flow imposing means, said valving means being subjected at all times to such pressure as obtains at said second port to be biased by said pressure toward said second valving position, said valving means being subjected at all times to means for biasing it toward said first valving position, said last-named means being capable of being overridden by a sufficient elevation of said pressure at said second port, whereby when said second header is relieved of pressure then thereafter feeding of fluid to said second header is a necessary condition for initiation and completion of injection of fluid to any of said lubricating sites from any of said units and relief of pressure established in said first header is an unnecessary condition as to both initiation and completion of injection of fluid to any of said lubricating sites from any of said units.

2. In a lubricating system, a plurality of lubricating fluid injector units each having a first port for accepting fluid to be injected to an associated lubricating site, a second port for accepting fluid for imposing injection pressure and a third port emptying to said associated lubricating site, a first header connected to said first ports, a second header connected to said second ports, means for supplying fluid to said first header and for alternately supplying fluid under relatively higher pressure to said second header and relieving said second header, each injector unit including first and second coaxial hydraulic piston chambers, hydraulic piston means in fluid-sealing sliding relationship with each of said first and second chambers and associating said chambers in hydraulic opposition to each other for back and forth movement of said hydraulic piston means between first and second limiting end positions at which are minimized the volumes of said first and second chambers, respectively, a valve in each unit and including valving means movable between a first valving position at which said first chamber is connected to receive inflow from said first port and said second chamber is connected to said second port solely through one-way flow imposing means allowing flow from said second chamber to said second port but not in the opposite direction and a second valving position at which said first chamber is connected to empty to said third port and said second chamber and second port are interconnected to bypass said one-way flow imposing means, said valving means being subjected at all times to such pressure as obtains at said second port to be biased by said pressure toward said second valving position, said valving means being subjected at all times to such pressure as obtains at said first port to be biased by said pressure toward said first valving position.

3. A lubricating fluid injector unit for automatic lubricating systems having a first port for accepting fluid to be injected to a desired lubricated site, a second port for accepting fluid for imposing injection pressure and a third port for ejecting fluid to line means leading to said lubricated site, said injector unit including first and second coaxial hydraulic piston chambers, hydraulic piston means in fluid-sealing sliding relationship with each of said first and second chambers and associating said chambers in hydraulic opposition to each other for back and forth movement of said hydraulic piston means between first and second limiting end positions at which are minimized the volumes of said first and second chambers respectively, a valve in said unit and including valving means movable between a first valving position at which said first chamber is connected to receive inflow from said first port and said second chamber is connected to said second port solely through one-way flow imposing means allowing flow from said second chamber to said second port but not in the opposite direction and a second valving position at which said first chamber is connected to empty to said third port and said second chamber and second port are interconnected to bypass said one-way flow imposing means, said valving means being subjected at all times to such pressure as obtains at said second port to be biased by said pressure toward said second valving position, said valving means being subjected at all times to means for biasing it toward said first valving position, said last-named means being capable of being overridden by a sufficient elevation of said pressure at said second port.

4. A lubricating fluid injector unit for automatic lubricating systems having a first port for accepting fluid to be injected to a desired lubricated site, a second port for accepting fluid for imposing injection pressure and a third port for ejecting fluid to line means leading to said lubricated site, said injector unit including first and second coaxial hydraulic piston chambers, hydraulic piston means in fluid-sealing sliding relationship with each of said first and second chambers and associating said chambers in hydraulic opposition to each other for back and forth movement of said hydraulic piston means between first and second limiting end positions at which are minimized the volumes of said first and second chambers respectively, a valve in said unit and including valving means movable between a first valving position at which said first chamber is connected to receive inflow from said first port and said second chamber is connected to said second port solely through one-way flow imposing means allowing flow from said second chamber to said second port but not in the opposite direction and a second valving position at which said first chamber is connected to empty to said third port and said second chamber and second port are interconnected to bypass said one-way flow imposing means, said valving means being subjected at all times to such pressure as obtains at said second port to be biased by said pressure toward said second valving position, said valving means being subjected at all times to such pressure as obtains at said first port to be biased by said pressure toward said first valving position.

References Cited in the file of this patent

UNITED STATES PATENTS

| | | |
|---|---|---|
| 1,891,544 | Kerns | Dec. 20, 1932 |
| 1,961,051 | Kerns | Oct. 4, 1934 |
| 2,719,603 | Le Clair | Oct. 4, 1955 |